United States Patent
Cudak et al.

(10) Patent No.: US 9,251,104 B2
(45) Date of Patent: Feb. 2, 2016

(54) AUTOMATICALLY CHANGING APPLICATION PRIORITY AS A FUNCTION OF A NUMBER OF PEOPLE PROXIMATE TO A PERIPHERAL DEVICE

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 14/102,555

(22) Filed: Dec. 11, 2013

(65) Prior Publication Data

US 2015/0161063 A1    Jun. 11, 2015

(51) Int. Cl.

| G06F 13/18 | (2006.01) |
|---|---|
| G10L 17/22 | (2013.01) |
| G06F 3/00 | (2006.01) |
| G06K 9/00 | (2006.01) |
| G10L 15/08 | (2006.01) |
| H04L 29/08 | (2006.01) |

(Continued)

(52) U.S. Cl.
CPC ............... *G06F 13/18* (2013.01); *G06F 3/005* (2013.01); *G06K 9/00228* (2013.01); *G10L 15/08* (2013.01); *G10L 17/22* (2013.01); *H04L 67/16* (2013.01); *H04N 7/183* (2013.01); *H04N 21/422* (2013.01); *H04N 21/44218* (2013.01)

(58) Field of Classification Search
CPC ....... G06F 3/005; G06F 13/18; H04N 21/422; H04N 21/44218; H04N 7/183; G10L 15/08; G10L 17/22; H04L 67/16; G06K 9/00228
See application file for complete search history.

(56) References Cited

U.S. PATENT DOCUMENTS

2004/0117436 A1 * 6/2004 Newman ................ G06Q 10/06 709/203
2007/0257927 A1 * 11/2007 Sakanishi ................ H04N 9/12 345/581

(Continued)

OTHER PUBLICATIONS

IBM; "Smart Data Organization Mechanism for Supporting Virtual User Group Activities"; An IP.com Prior Art Database Technical Disclosure; http://ip.com/IPCOM/000191335D; Dec. 30, 2009, 6 pages.

(Continued)

*Primary Examiner* — Ryan A Lubit
(74) *Attorney, Agent, or Firm* — Jeffrey L. Streets

(57) ABSTRACT

A computer program product is provided including computer readable program code for running an application on a computer having a display, wherein the application requires external network access. The computer program product further includes computer readable program code for determining a number of people gathered around the computer, and computer readable program code for automatically changing the network priority of the application as a function of the number of people determined to be gathered around the computer. The number of people gathered around the computer is preferably determined using a facial recognition module to analyze an image captured by a camera of the computer or using a speech recognition module to analyze sound captured by a microphone of the computer.

19 Claims, 5 Drawing Sheets

(51) Int. Cl.
   *H04N 7/18*      (2006.01)
   *H04N 21/422*    (2011.01)
   *H04N 21/442*    (2011.01)

(56) References Cited

U.S. PATENT DOCUMENTS

| | | | | |
|---|---|---|---|---|
| 2008/0133249 | A1* | 6/2008 | Hashiguchi | G10L 19/167 704/500 |
| 2008/0162659 | A1* | 7/2008 | Jia | H04L 29/12283 709/207 |
| 2009/0048908 | A1* | 2/2009 | Kaplan | G06Q 30/02 705/7.33 |
| 2009/0122702 | A1* | 5/2009 | Chew | H04L 12/5695 370/235 |
| 2009/0249222 | A1 | 10/2009 | Schmidt et al. | |
| 2011/0246604 | A1* | 10/2011 | Imanishi | H04N 21/2187 709/217 |
| 2012/0290508 | A1 | 11/2012 | Bist | |
| 2015/0000026 | A1* | 1/2015 | Clements | G06F 3/013 4/443 |

OTHER PUBLICATIONS

Internet Society et al.; "Communications Resource Priority for the Session Initiation Protocol (SIP) (RFC4412)"; An IP.com Prior Art Database Technical Disclosure; http://ip.com/IPCOM/000134297D; Mar. 1, 2006, 38 pages.

* cited by examiner

AUTOMATICALLY CHANGING APPLICATION PRIORITY AS A FUNCTION OF A NUMBER OF PEOPLE PROXIMATE TO A PERIPHERAL DEVICE

BACKGROUND

1. Field of the Invention

The present invention relates to management of network and application priority in a computer system.

2. Background of the Related Art

Computers are useful for many tasks at home, at work, and on the go. Many types of applications have been developed to increase the efficiency with which a task can be completed. The computer hardware itself has been steadily advanced to run faster and more reliably, and peripheral devices are available to expand or improve the capabilities of a particular computer system.

A group of computers may be connected together through a local area network (LAN) in order to communicate with each other and share certain resources, such as printers and data storage devices. These computers may also share a connection to a global communication network, such as the Internet, through a network switch. However, the physical lines and the service of providing a connection to the Internet are typically provided by a third party entity referred to as an Internet Service Provider (ISP). An entity will enter into a service agreement with the ISP to provide up to a predetermined rate of data transfer ("bandwidth") in exchange for monthly payment. This bandwidth is then shared among the users that have computers in the entity's LAN. Further, a service, such as YouTube may allocate only a certain level of bandwidth from the hosting site to a particular user.

While various useful applications may be run entirely within the entity's LAN, external email communications and browser activity will utilize some of the limited bandwidth available. Graphics, animation and video are increasingly available over the Internet, but require significant bandwidth. Streaming video, such as content found on YouTube.com, relies upon a high speed Internet connection in order to perform satisfactorily without periodic interruptions to buffer more data. While there is lots of entertaining video available on the Internet, there is also an expanding availability of educational videos, product training videos, and instructional videos.

Furthermore, more and more applications rely upon Internet access. Software as a Service (SaaS) is a model in which the software and related data are maintained on the servers of an Application Service Provider (ASP). The ASP is responsible for providing and maintaining the software and related data. However, the use of the software is dependent upon Internet access.

BRIEF SUMMARY

One embodiment of the present invention provides a computer program product including computer readable program code embodied on a computer readable storage medium. The computer program product comprises computer readable program code for running an application on a computer having a display, wherein the application requires external network access and produces an output to the peripheral device. The computer program product further comprises computer readable program code for determining a number of people proximate to the peripheral device, and computer readable program code for automatically changing the priority of the application as a function of the number of people determined to be proximate to the peripheral device.

DETAILED DESCRIPTION

Figure 1:
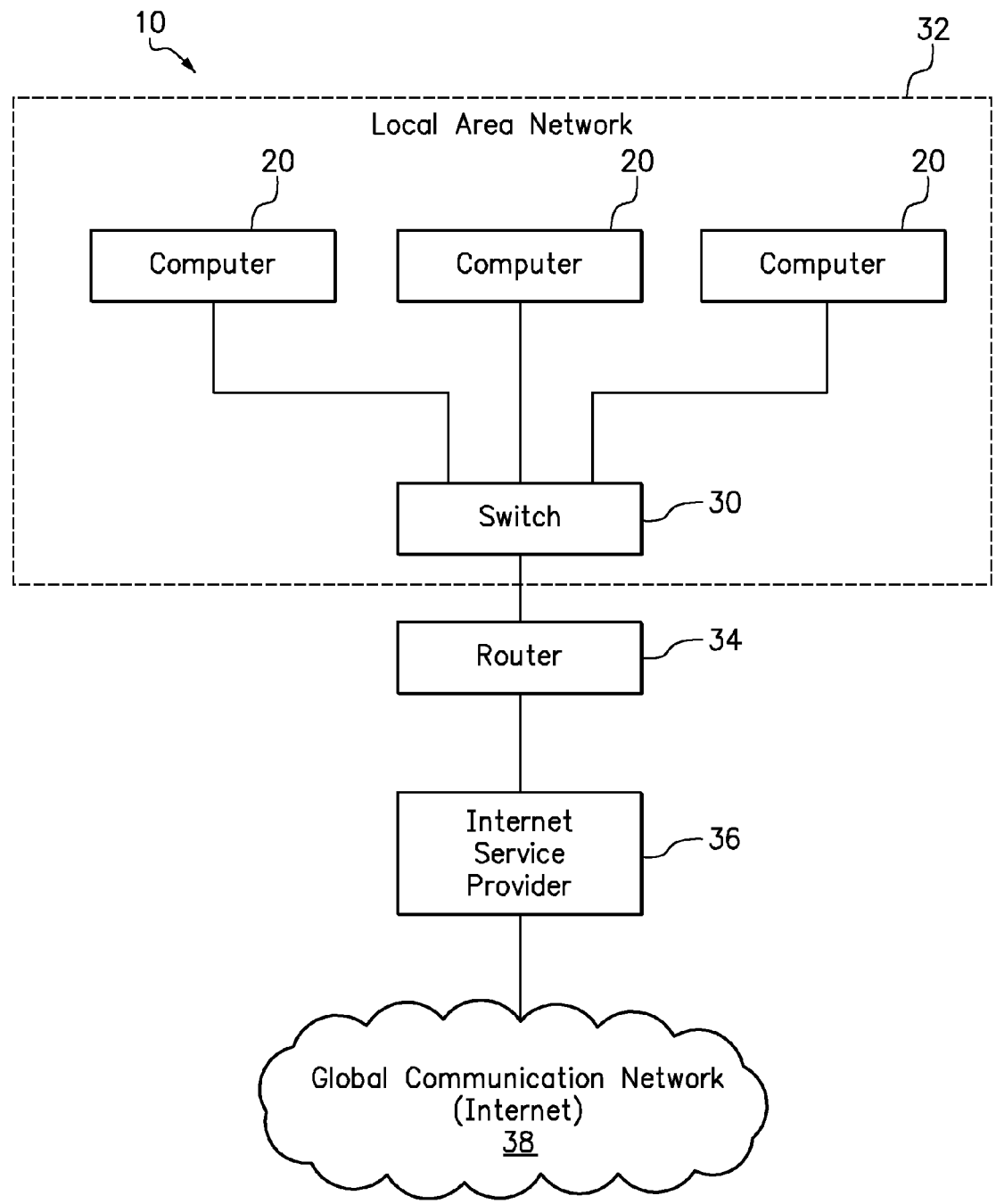
FIG. 1 is a diagram of a computer system in which embodiments of the present invention may be implemented.

One embodiment of the present invention provides a method comprising running an application on a computer having a display, wherein the application requires external network access and produces an output to the peripheral device. The method further comprises determining a number of people proximate to the peripheral device, and automatically changing the priority of the application as a function of the number of people determined to be proximate to the peripheral device. Optionally, the priority of the application is selected from network priority, provisioning priority, and combinations thereof. Network priority deals with the handling of incoming data from the network to the application, whereas provisioning priority deals with the source of the data being sent to the application over a communication link. As an example, increasing network priority of an application may instruct a network switch to dedicate more bandwidth to the application or the computer running the application. As another example, increasing provisioning priority may include a request to a hosting system to increase the performance of the service being used. More specifically, a computer running a web browser application to view videos, perhaps on a streaming video service such as YouTube.com, may detect that the primary user and four other people are proximate to the display, and the computer may therefore request that the video service increase priority or performance given to provisioning videos to the computer.

The application may be any software program that requires access to an external network to accomplish a task. Non-limiting examples of the application include email software and a web browser. A web browser may be used for various purposes, including access to hypertext markup language (HTML) content, file downloads, videos, radio or television channels, and any software program that is hosted on an external web server or the cloud (i.e., Software as a Service (SaaS)). In a specific example, the application is a web browser and the peripheral device is a display screen, such that the web browser receives a video file over the external network and displays the video on the display screen, wherein priority of the web browser is increased to maintain a predetermined amount of buffered video and avoid interruption of video playback. In another example, the application may be a media player and the peripheral device is a speaker. The media player may receive an audio file over the external network and output the audio on the speaker, wherein priority of the media player application is increased to maintain a predetermined amount of buffered audio and avoid interruption of audio playback.

In another embodiment, the method further includes detecting an interruption in performance of the application on the computer due to a limitation in the network bandwidth allocated to the application or the computer running the application. If the number of people determined to be proximate to the peripheral device is greater than one, then the priority of the application may be increased in response to the interruption. An interruption may or may not be observable to the user as a sluggish response. For example, where the application is a web browser that is displaying a video file, an interruption may manifest itself as repeated buffering of the video file data stream. Furthermore, the method may further include detecting an interruption in performance of the application on the computer, wherein the provisioning priority of the application is increased in response to the interruption.

Automatically changing the priority of the application may optionally include automatically changing the network priority of the computer running the application. Where the network priority of the computer running the application is increased, the application should run better as a result of having greater network priority. Alternatively, automatically changing the network priority of the application may include automatically changing an amount of bandwidth requested for use by the application. Similarly, automatically changing the priority of the application may include automatically changing the provisioning priority of the application running on the computer or service provider, such as YouTube.

In a separate option, automatically changing the priority of the application as a function of the number of people determined to be proximate to the peripheral device may include automatically increasing the network priority of the application in proportion to the number of people proximate to the peripheral device other than the primary user of the computer. For example, the application may be given standard priority when only being viewed by the primary user of the computer. The priority of the application may be increased by a given increment when a first additional person or viewer is determined to be proximate to the peripheral device, and increased again by the same increment when a second additional person or viewer is determined to be proximate to the peripheral device. Accordingly, the network priority of the application may scale in proportion to the number of viewers other than the primary user. Similarly, automatically changing the priority of the application may include automatically increasing the provisioning priority of the application in proportion to the number of people proximate to the peripheral device other than the primary user of the computer.

The number of people proximate to the peripheral device may be determined in various ways. For instance, a camera of the computer may be used to capture an image of an area around the computer and then the captured image may be analyzed using a facial recognition module. The number of faces in the captured image can be quickly determined. Optionally, the method may further use the facial recognition module to determine the identity of one or more of the people proximate to the peripheral device. Automatically changing the priority of the application may thus include increasing priority of the application in response to determining that the identity of one or more of the people proximate to the peripheral device is included in a predetermined list of people. The predetermined list of people may, for example, include members of upper management for an entity in which the computer is being used. Accordingly, the priority for a running application may be increased whenever a member of upper management is determined to be viewing the computer display screen rendered by the application.

The number of people proximate to the peripheral device may also be determined using a microphone of the computer to detect sounds from the area around the computer and analyzing the sounds using a voice recognition module. In one instance, the voice recognition module may include a speech recognition module that identifies one or more spoken phrases indicating the presence of people proximate to the peripheral device. For example, the speech recognition module may recognize various trigger phrases, such as "look at this" or "check this out", or count the number of voices detectable above a certain decibel level. In another instance, the voice recognition module may include a speaker recognition module that determines the identity of one or more people proximate to the peripheral device.

Still further, it may be determined that there are at least two people proximate to the peripheral device in response to usage of a projection apparatus or an external display port. Non-limiting examples of the external display port may be selected from a high definition multimedia interface (HDMI) port and a video graphics adapter (VGA) port.

The types of peripheral devices that may be used in accordance with one or more embodiment of the present invention should not be limited to any particular peripheral device that is now known or developed in the future. A peripheral device is a device connected to a host computer that expands the capabilities of the host computer, such as providing an additional manner of input, output or storage. A non-limiting list of peripheral devices includes display devices, speakers, cameras, printers, tablet computers, smartphones, and keyboards.

Another embodiment of the present invention provides a computer program product including computer readable program code embodied on a computer readable storage medium. The computer program product comprises computer readable program code for running an application on a computer having a peripheral device, wherein the application requires external network access and produces an output to the peripheral device. The computer program product further comprises computer readable program code for determining a number of people proximate to the peripheral device, and computer readable program code for automatically changing the priority of the application as a function of the number of people determined to be proximate to the peripheral device.

The foregoing computer program products may further include computer readable program code for implementing or initiating any one or more aspects of the methods described herein. Accordingly, a separate description of the methods will not be duplicated in the context of a computer program product.

FIG. 1 is a diagram of a computer system 10 in which embodiments of the present invention may be implemented. A number of computers 20 are connected together by a network switch 30 to form a local area network 32. The switch 30 may include or be connected to a router 34 that forwards data packets between the local area network 32 and an Internet Service Provider (ISP) 36. The ISP 36 provides access to a global communications network 38, such as the Internet.

Figure 2A:
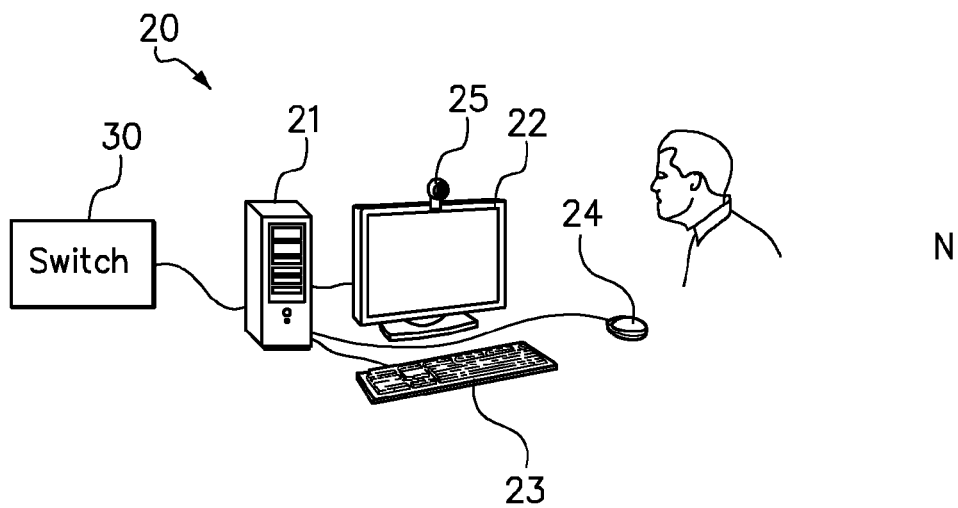
FIGS. 2A-2C are diagrams of an individual computer being viewed by one person, three people and four people, respectively.
Figure 2B:
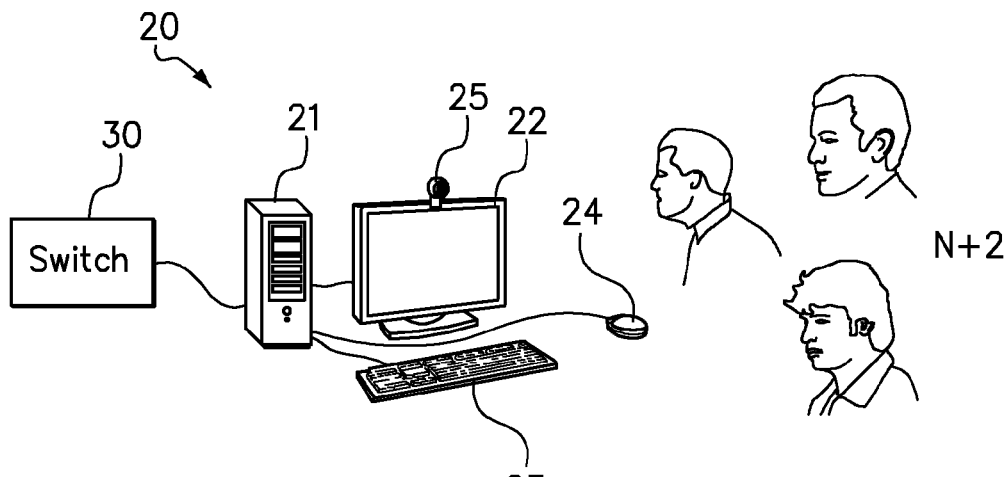
Figure 2C:
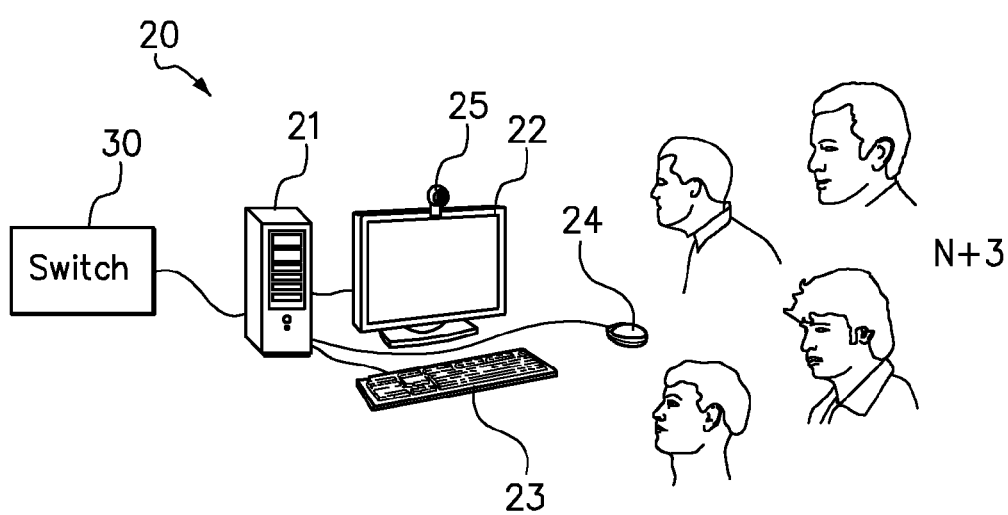

FIGS. 2A-2C are diagrams of an individual computer 20 being viewed by one person, three people and four people, respectively. The computer 20 includes, for example, a tower 21 that houses a motherboard, a network card, a video/graphics adapter card, power supply, fans and other common components. The computer 20 also includes a display 22, a keyboard 23, and a mouse 24. Furthermore, the computer may further include a unit 25 having a camera and microphone. An output port from the computer, such as an Ethernet port, is coupled to the switch 30. Other components of the computer system 10 of FIG. 1 are not shown.

In FIG. 2A, the computer 20 is being viewed by one person (N) who is the primary user of this computer. As shown, the person is located in front of the camera unit 25 and is close enough for the built-in microphone to detect words spoken by the person. Accordingly, the computer 20 is able to determine that there is only one person (N) proximate to the display 22 (the peripheral device) for viewing. In FIG. 2B, the computer 20 will determine that there are three people proximate to the display 22. For example, it may be determined that the primary user and two other people (N+2) are viewing the display 22. In FIG. 2C, the computer 20 will determine that there are four people proximate to the display 22. For example, it may be determined that the primary user and three other people (N+3) are viewing the display 22. As discussed herein, the number of people, and perhaps their identity, may be determined using a facial recognition software module or a speech recognition software module.

Figure 3:
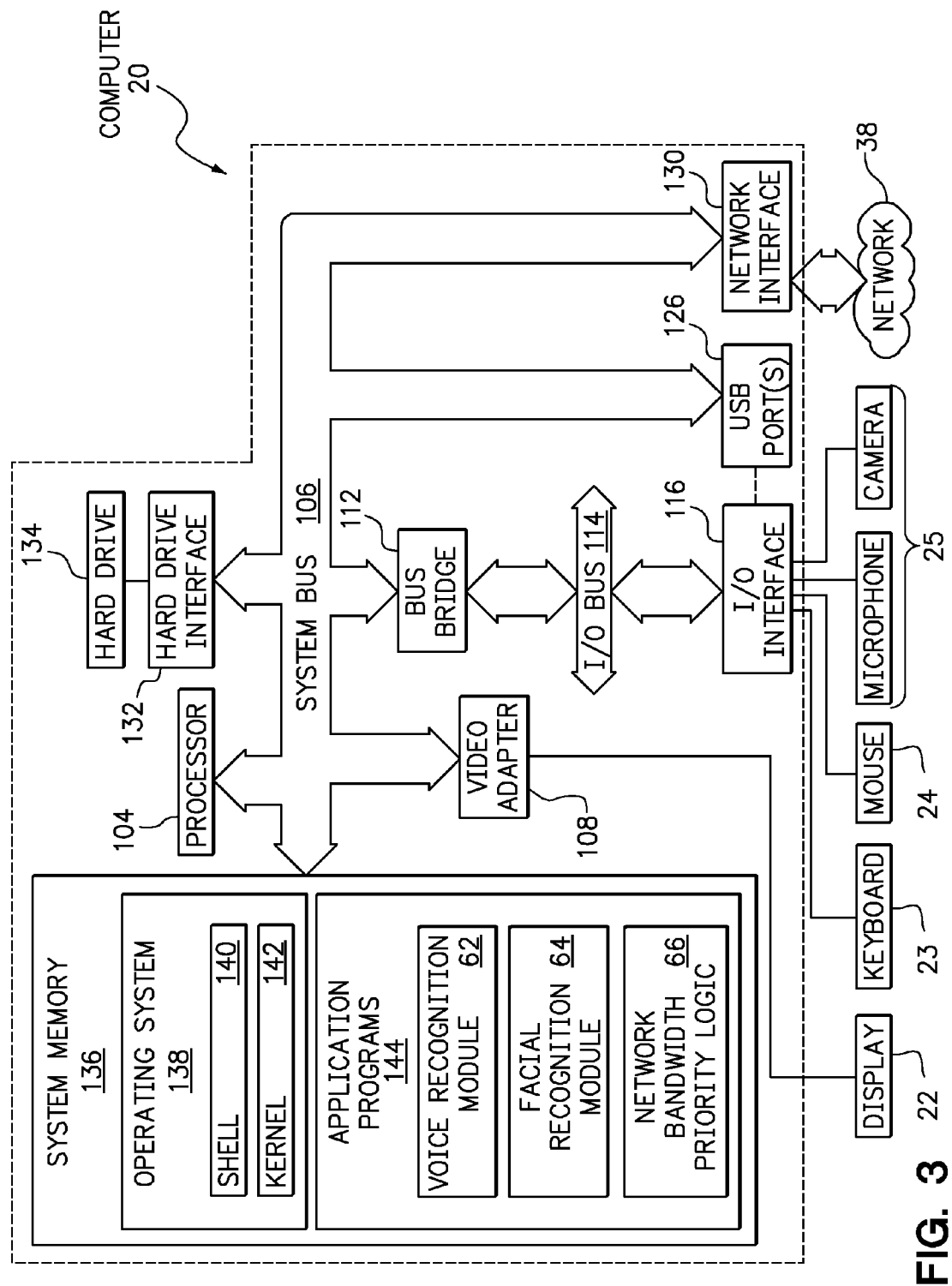
FIG. 3 is a diagram of an exemplary computer that may be utilized in accordance with various embodiments of the present invention.

FIG. 3 is a diagram of an exemplary compute node (or simply "computer") 20 that may be used accordance with the present invention. The computer 20 includes a processor unit 104 that is coupled to a system bus 106. Processor unit 104 may utilize one or more processors, each of which has one or more processor cores. A video adapter 108, which drives/supports a display 22, is also coupled to system bus 106.

The system bus 106 is coupled via a bus bridge 112 to an input/output (I/O) bus 114. An I/O interface 116 is coupled to I/O bus 114. I/O interface 116 affords communication with various I/O devices, including a keyboard 23, a mouse 24, and a microphone and camera unit 25. The I/O devices may optionally include storage devices, such as CD-ROM drives and multi-media interfaces, a printer, and external USB port(s). While the format of the ports connected to I/O interface 116 may be any known to those skilled in the art of computer architecture, in a preferred embodiment some or all of these ports are universal serial bus (USB) ports.

As depicted, the computer 20 is able to communicate over a network 38 using a network interface 130. The network 38 may be an external network, such as the global communication network, and perhaps also an internal network such as an Ethernet LAN or a virtual private network (VPN).

A hard drive interface 132 is also coupled to system bus 106 and interfaces with a hard drive 134. In a preferred embodiment, the hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes the computer's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes a kernel 142, which includes lower levels of functionality for OS 138, including providing essential services required by other parts of OS 138 and application programs 144, including memory management, process and task management, disk management, and mouse and keyboard management. The application programs 144 in the system memory of the computer 20 may include various programs and modules for implementing the methods described herein, such as the voice recognition module 62, the facial recognition module 64, and the network bandwidth priority logic 66.

The hardware elements depicted in computer 20 are not intended to be exhaustive, but rather are representative components suitable to perform the processes of the present invention. For instance, computer 20 may include alternate memory storage devices such as magnetic cassettes, digital versatile disks (DVDs), Bernoulli cartridges, and the like. These and other variations are intended to be within the spirit and scope of the present invention.

Figure 4:
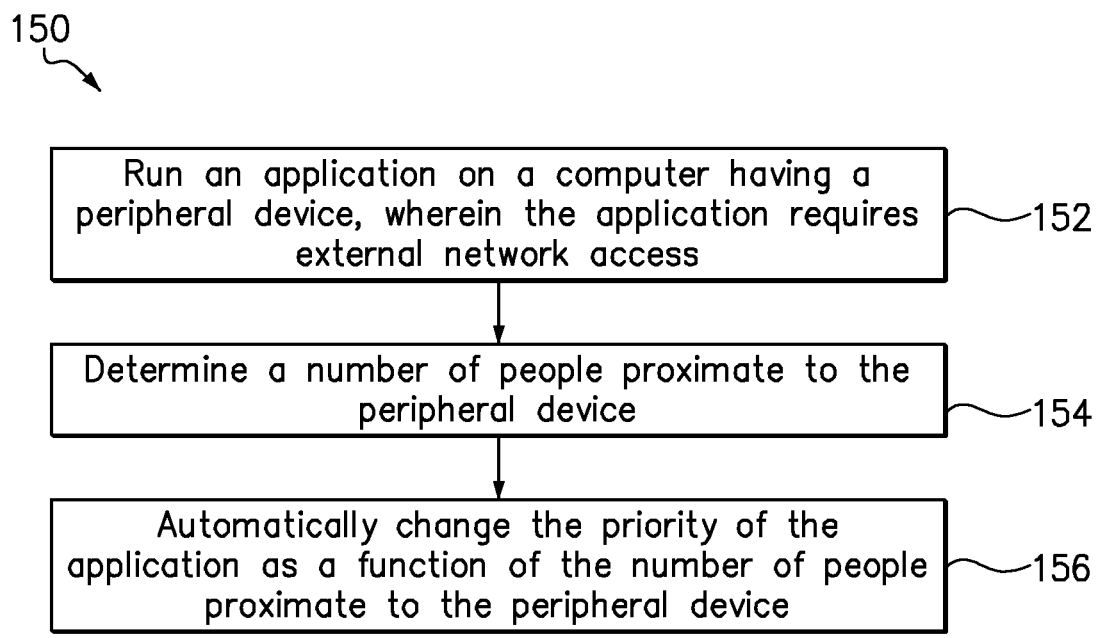
FIG. 4 is a flowchart of a method in accordance with one embodiment of the present invention.

FIG. 4 is a flowchart of a method 150 in accordance with one embodiment of the present invention. Step 152 includes running an application on a computer having a peripheral device, wherein the application requires external network access. Step 154 determines a number of people proximate to the peripheral device, and step 156 automatically changes the priority of the application as a function of the number of people proximate to the peripheral device.

Figure 5:
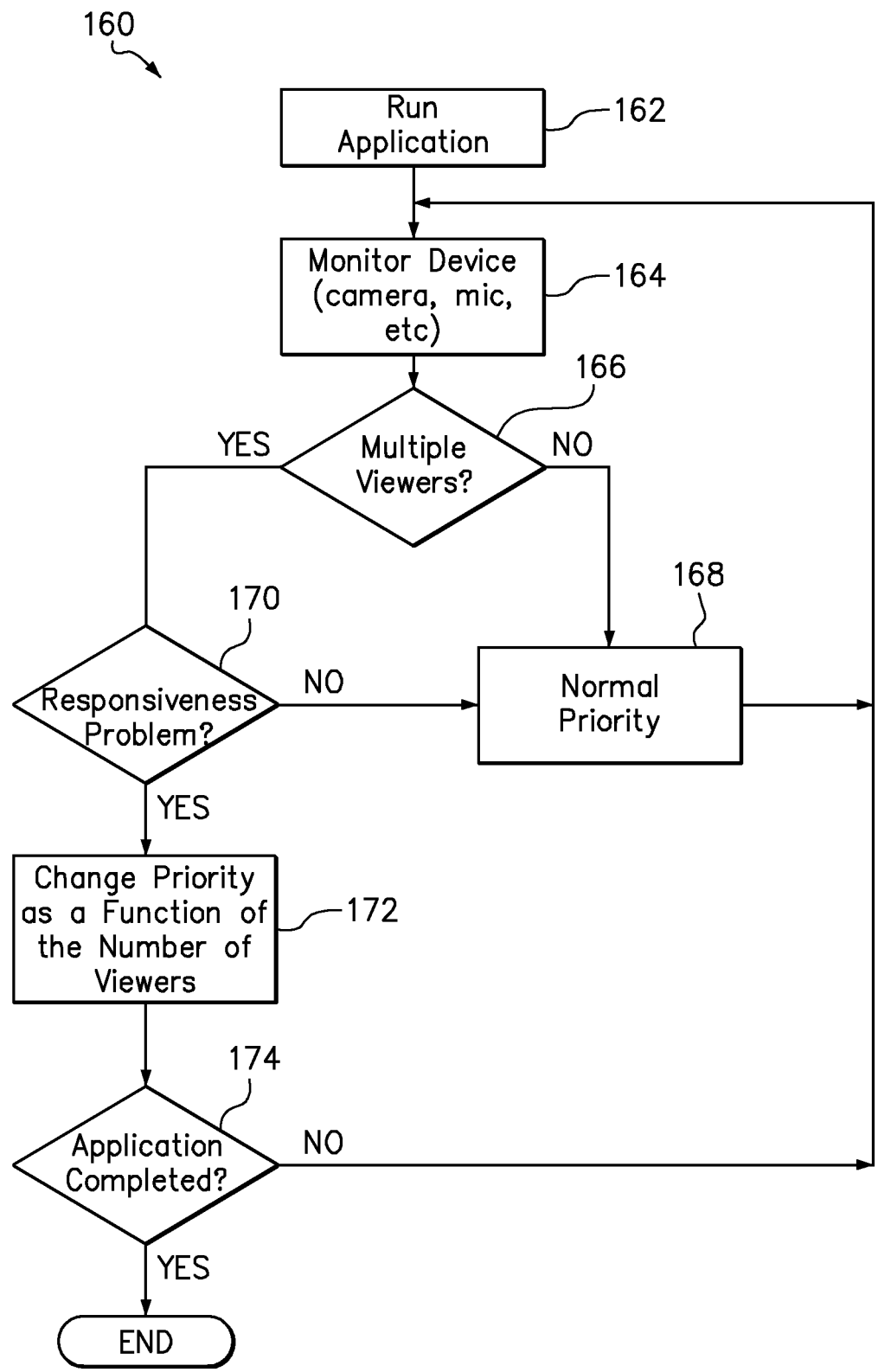
FIG. 5 is a flowchart of a method in accordance with another embodiment of the present invention.

FIG. 5 is a flowchart of a method 160 in accordance with another embodiment of the present invention. An application is run on the computer in step 162 and the computer monitors input from its sensory devices, such as a camera and microphone, in step 164. A determination is made, in step 166, whether there are multiple viewers. This determination may be made using a facial recognition module to analyze an image captured by the camera or using a speech recognition module to analyze sound captured by the microphone. If there are not multiple viewers, then step 168 maintains the application at normal priority for a single viewer. If there are multiple viewers, then the process proceeds to a determination, in step 170, whether the application is experiencing a responsiveness problem. If there is no responsiveness problem, then step 168 maintains the application at normal priority. However, if there is a responsiveness problem, then step 172 changes the priority as a function of the number of viewers. If the application has completed its task in step 174, then the process ends. Otherwise, the process continues back to step 164 to continue monitoring the devices, since the number of viewers may change while the application is running.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-transitory computer readable storage medium including instructions executable by a processor to cause the processor to perform operations comprising:
running an application on a computer having a peripheral device, wherein the peripheral device is configured to provide audio and/or visual output, and wherein the application requires external network access and produces an output to the peripheral device;

determining a number of people proximate to the peripheral device; and automatically changing a priority of the application in proportion to the number of people proximate to the peripheral device, wherein the priority of the application is selected from network priority, provisioning priority, and combinations thereof.

2. The non-transitory computer readable medium of claim 1, the method further comprising:
detecting an interruption in performance of the application on the computer, wherein the network priority of the application is increased in response to the interruption.

3. The non-transitory computer readable medium of claim 1, the method further comprising:
detecting an interruption in performance of the application on the computer, wherein the provisioning priority of the application is increased in response to the interruption.

4. The non-transitory computer readable medium of claim 1, wherein the application is a web browser and the peripheral device is a display screen.

5. The non-transitory computer readable medium of claim 4, wherein the web browser receives a video file over the external network and displays the video on the display screen, and wherein priority of the web browser is increased to maintain a predetermined amount of buffered video and avoid interruption of video playback.

6. The non-transitory computer readable medium of claim 1, wherein the application is a media player and the peripheral device is a speaker.

7. The non-transitory computer readable medium of claim 6, wherein the media player receives an audio file over the external network and outputs the audio on the speaker, and wherein priority of the media player is increased to maintain a predetermined amount of buffered audio and avoid interruption of audio playback.

8. The non-transitory computer readable medium of claim 1, wherein automatically changing the priority of the application as a function of the number of people proximate to the peripheral device includes automatically changing the network priority of the computer running the application.

9. The non-transitory computer readable medium of claim 1, wherein automatically changing the priority of the application as a function of the number of people proximate to the peripheral device includes automatically changing an amount of bandwidth requested for use by the application.

10. The non-transitory computer readable medium of claim 1, wherein determining a number of people proximate to the peripheral device includes using a camera of the computer to capture an image of an area proximate to the peripheral device and analyzing the captured image using a facial recognition module.

11. The non-transitory computer readable medium of claim 10, the method further comprising:
determining the identity of one or more of the people proximate to the peripheral device using the facial recognition module, wherein automatically changing the priority of the application includes increasing priority of the application in response to determining that the identity of one or more of the people proximate to the peripheral device is included in a predetermined list of people.

12. The non-transitory computer readable medium of claim 1, wherein determining a number of people proximate to the peripheral device includes using a microphone of the computer to detect sounds from the area proximate to the peripheral device and analyzing the sounds using a voice recognition module.

13. The non-transitory computer readable medium of claim 12, wherein the voice recognition module includes a speech recognition module identifying one or more spoken phrases indicating the presence of people proximate to the peripheral device.

14. The non-transitory computer readable medium of claim 12, wherein the voice recognition module includes a speaker recognition module determining the identity of one or more people proximate to the peripheral device.

15. The non-transitory computer readable medium of claim 1, wherein determining a number of people proximate to the peripheral device includes determining that there are at least two people proximate to the peripheral device in response to usage of a projection apparatus.

16. The non-transitory computer readable medium of claim 1, wherein determining a number of people proximate to the peripheral device includes determining that there are at least two people proximate to the peripheral device in response to usage of an external display port.

17. The non-transitory computer readable medium of claim 16, wherein the external display port is selected from high definition multimedia interface (HDMI) and video graphics adapter (VGA).

18. The non-transitory computer readable medium of claim 1, wherein automatically changing the priority of the application as a function of the number of people determined to be proximate to the peripheral device includes automatically increasing the network priority of the application in proportion to the number of people proximate to the peripheral device other than the primary user of the computer.

19. The non-transitory computer readable medium of claim 1, wherein automatically changing the priority of the application as a function of the number of people proximate to the peripheral device includes automatically increasing the provisioning priority of the application in proportion to the number of people proximate to the peripheral device other than the primary user of the computer.

* * * * *